United States Patent
Nam et al.

(10) Patent No.: US 10,795,239 B2
(45) Date of Patent: Oct. 6, 2020

(54) DRAINAGE STRUCTURE AND ELECTRONIC DEVICE HAVING SAME

(71) Applicant: Samsung Electronics Co., Ltd., Suwon-si, Gyeonggi-do (KR)

(72) Inventors: An-Jin Nam, Suwon-si (KR); Bong-Suk Choi, Seoul (KR); Hye-Lim Kim, Suwon-si (KR); Chan-Don Joo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 32 days.

(21) Appl. No.: 16/161,742

(22) Filed: Oct. 16, 2018

(65) Prior Publication Data

US 2019/0113826 A1    Apr. 18, 2019

(30) Foreign Application Priority Data

Oct. 17, 2017   (KR) .......................... 10-2017-0134789

(51) Int. Cl.
*G03B 17/08* (2006.01)
*H04N 5/225* (2006.01)
*G02B 23/16* (2006.01)
*G02B 13/06* (2006.01)
*G02B 7/02* (2006.01)

(52) U.S. Cl.
CPC ............ *G03B 17/08* (2013.01); *G02B 13/06* (2013.01); *G02B 23/16* (2013.01); *H04N 5/2252* (2013.01); *H04N 5/2258* (2013.01); *G02B 7/02* (2013.01)

(58) Field of Classification Search
CPC ...... G03B 17/08; G03B 37/04; H04N 5/2252; H04N 5/2258; H04N 5/23238; H04N 5/247; H04N 13/239; H04N 13/243; G02B 7/02; G02B 23/16; G02B 13/06; H04M 1/04
USPC .................................................. 348/373–376
See application file for complete search history.

(56) References Cited

U.S. PATENT DOCUMENTS

| | | | |
|---|---|---|---|
| 8,339,394 B1 * | 12/2012 | Lininger ................. | G06T 15/04 345/419 |
| 9,357,114 B1 * | 5/2016 | Whitehead ............. | H04N 5/247 |
| 9,544,476 B2 * | 1/2017 | Ishida ...................... | G01S 19/14 |
| 9,609,234 B1 * | 3/2017 | Checka ............. | H01L 27/14618 |

(Continued)

FOREIGN PATENT DOCUMENTS

JP   H05-065960 A   3/1993
JP   2011-34101 A   2/2011

*Primary Examiner* — Pritham D Prabhakher
(74) *Attorney, Agent, or Firm* — Jefferson IP Law, LLP

(57) ABSTRACT

An electronic device is provided. The electronic device includes an upper cover in which at least one first camera facing a first direction is disposed, a housing in which a plurality of second cameras is disposed facing a second direction different from the first direction, a lower cover disposed to face the upper cover with the housing interposed therebetween, the lower cover being configured to cover a third direction different from the first direction, and a drainage structure penetrating the housing from the upper cover and connected to the lower cover. The drainage structure includes a drainage hole disposed adjacent to the at least one first camera, at least one first conduit extending from the upper cover in the third direction, and at least one second conduit extending in the first direction from the lower cover and connected to the at least one first conduit.

19 Claims, 10 Drawing Sheets

(56) References Cited

U.S. PATENT DOCUMENTS

| | | | | |
|---|---|---|---|---|
| 9,851,623 | B2* | 12/2017 | MacMillan | G03B 37/04 |
| 9,921,464 | B1* | 3/2018 | Choi | G03B 37/04 |
| 10,397,453 | B2* | 8/2019 | Choi | H04N 13/239 |
| 2010/0033371 | A1* | 2/2010 | Kumagai | G01S 19/36 |
| | | | | 342/357.31 |
| 2012/0019661 | A1* | 1/2012 | Thomson | G03B 17/02 |
| | | | | 348/157 |
| 2012/0154521 | A1* | 6/2012 | Townsend | H04N 5/247 |
| | | | | 348/36 |
| 2014/0160274 | A1* | 6/2014 | Ishida | G01S 19/14 |
| | | | | 348/113 |
| 2016/0236350 | A1* | 8/2016 | Ono | B25J 9/1697 |
| 2017/0028936 | A1* | 2/2017 | Matsumoto | B62D 37/02 |
| 2017/0207443 | A1 | 7/2017 | Shen et al. | |
| 2018/0067210 | A1* | 3/2018 | Matsuyama | H04N 5/2253 |

* cited by examiner

DRAINAGE STRUCTURE AND ELECTRONIC DEVICE HAVING SAME

CROSS-REFERENCE TO RELATED APPLICATION(S)

This application is based on and claims priority under 35 U.S.C. § 119(a) of a Korean patent application number 10-2017-0134789, filed on Oct. 17, 2017, in the Korean Intellectual Property Office, the disclosure of which is incorporated by reference herein in its entirety.

BACKGROUND

1. Field

The disclosure relates to a drainage structure and an electronic device including the same.

2. Description of the Related Art

Electronic devices may mean devices that perform specific functions according to programs incorporated therein, including electronic schedulers, portable multimedia reproducers, mobile communication terminals, tablet personal computers (PCs), image/sound devices, desktop PCs, laptop PCs, or vehicular navigation systems, as well as home appliances. For example, the above-mentioned electronic devices may output information stored therein as sounds or images. As the degree of integration of such electronic devices has increased and super-high speed, large-capacity wireless communication has become popular, various functions have come to be provided by a single electronic device, such as a mobile communication terminal. For example, various functions, such as entertainment functions (e.g., a game function), multimedia functions (e.g., a music/video reproducing function), communication and security functions for mobile banking, schedule management functions, and e-wallet functions, are integrated into a single electronic device, in addition to communication functions.

Recently, the development of cameras in electronic devices has accelerated, and as the distribution of cameras expands, the amount of people taking panorama images or three-dimensional stereoscopic images in their daily lives, using cameras that have a view angle of 180 degrees or more, is gradually increasing. In addition, cameras capable of capturing panorama or three-dimensional images are utilized in facilities (e.g., a museum) for services that provide realistic guidance, or are used in public facilities as surveillance cameras that do not have blind spots, or the like.

The above information is presented as background information only to assist with an understanding of the disclosure. No determination has been made, and no assertion is made, as to whether any of the above might be applicable as prior art with regard to the disclosure.

SUMMARY

An omni-directional photographing camera, which is used in an electronic device, has a hemispherical camera lens which is mounted such that a substantial portion thereof protrudes to the outside. The protruding camera lens may be damaged when the electronic device falls and/or by an external impact.

In an electronic device including a camera, the view angle of the camera may deteriorate due to the risk of flooding caused by an external fluid or the like and due to flooding around the camera. In addition, since the electronic device includes many electronic components therein, there is a risk of system overload due to heat generation, and when used outdoors, there is a risk of flooding caused by an external fluid or the like.

Aspects of the disclosure are to address at least the above-mentioned problems and/or disadvantages and to provide at least the advantages described below. Accordingly, an aspect of the disclosure is to provide a drainage structure capable of preventing the flooding of a camera and the electronic device that includes the drainage structure by installing the drainage structure in the peripheral region of the camera.

Additional aspects will be set forth in part in the description which follows and, in part, will be apparent from the description, or may be learned by practice of the presented embodiments.

In accordance with an aspect of the disclosure, an electronic device is provided. The electronic device includes an upper cover in which at least one first camera facing a first direction is disposed, a housing in which a plurality of second cameras is disposed facing a second direction different from the first direction, a lower cover disposed to face the upper cover with the housing interposed therebetween, the lower cover being configured to cover a third direction different from the first direction, and a drainage structure penetrating the housing from the upper cover and connected to the lower cover. The drainage structure includes a drainage hole disposed adjacent to the at least one first camera, at least one first conduit extending from the upper cover in the third direction, and at least one second conduit extending in the first direction from the lower cover and connected to the at least one first conduit.

In accordance with another aspect of the disclosure, an electronic device is provided. The electronic device includes an upper cover in which at least one first camera facing a first direction is disposed, a housing in which a plurality of second cameras is disposed facing a second direction perpendicular to the first direction, a plate coupled to the upper cover and configured to include an inclined face on one surface thereof in order to enclose a periphery of the at least one first camera, and a drainage structure configured to prevent a flooding of the first camera. The drainage structure includes a drainage opening disposed at a lower end of the inclined face and adjacent to the at least one first camera, a drainage hole connected to the drainage opening and disposed through the upper cover, and at least one conduit disposed through the housing and extending from the drainage hole.

In accordance with another aspect of the disclosure, an electronic device is provided. The electronic device includes a main body, at least one first camera disposed toward a first direction, a plurality of second cameras disposed toward a second direction different from the first direction, and a drainage hole disposed at a portion of the main body adjacent to the at least one first camera, the drainage hole facing the first direction.

In a drainage structure, according to various embodiments, and an electronic device including the drainage structure, the camera lens exposed to the outside and the periphery thereof are recessed, and thus external impacts are not directly transmitted to the camera lens. Thus, it is possible to protect the camera.

In a drainage structure, according to various embodiments, and an electronic apparatus including the drainage structure, the drainage structure is implemented around the camera. Thus, it is possible to prevent flooding of the camera lens exposed to the outside and the periphery thereof.

In a drainage structure according to various embodiments, and an electronic device including the drainage structure, a drainage structure which penetrates the inside of the electronic device is implemented. Thus, it is possible to provide a fine aesthetic sense of the electronic device without effecting the appearance of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
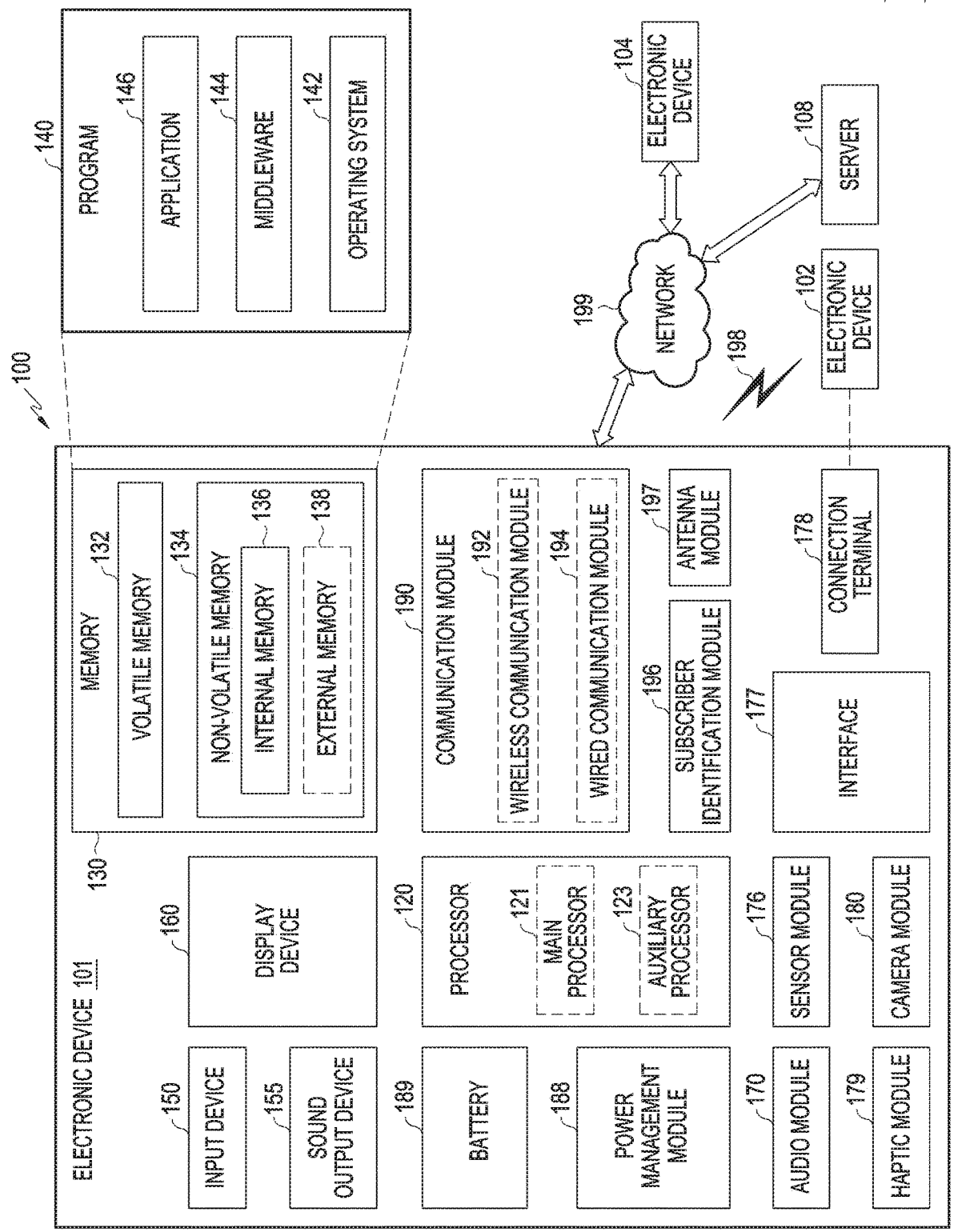
FIG. 1 is a block diagram illustrating an electronic device within a network environment according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to embodiments is not limited to the above-described devices.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B," "one or more of A and/or B," "A, B, or C," or "one or more of A, B and/or C" may include all possible combinations of them. The expression "a first," "a second," "the first," or "the second" used in various embodiments may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic," "logical block," "component," "circuit," or the like. The "module" may be an integrated component, or a minimum unit for performing one or more functions or a part thereof. For example, a module may be an application-specific integrated circuit (ASIC).

Various embodiments disclosed herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

The method according to various embodiments disclosed herein may be included and provided in a computer program product. The computer program product may be traded as a product between a seller and a buyer. The computer program product may be distributed in the form of a machine-readable storage medium (e.g., compact disc-read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations. Hereinafter, an electronic device according to various embodiments will be described with reference to the accompanying drawings. In the disclosure, the term "user" may indicate a person using an electronic device or a device (e.g., an artificial intelligence electronic device) using an electronic device.

FIG. 1 is a block diagram illustrating an electronic device in a network environment according to various embodiments of the disclosure.

Referring to FIG. 1, an electronic device 101 in a network environment 100 may communicate with an electronic device 102 via a first network 198 (e.g., short-range wireless communication), or may communicate with an electronic device 104 or a server 108 via a second network 199 (e.g., long-range wireless communication). According to an embodiment, the electronic device 101 may communicate with the electronic device 104 via the server 108. According to one embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, at least one of these components (e.g., the display device 160 or the camera module 180) may be omitted from the electronic device 101, or another component may be added to the electronic device 101. In some embodiments, some components may be implemented in an integrated form, like, for example, the sensor module 176 (e.g., a fingerprint sensor, an iris sensor, or an illuminance sensor), which is embedded in, for example, the display device 160 (e.g., a display).

The processor 120 may control one or more other components (e.g., a hardware or software component) of the electronic device 101, which are connected to the processor 120, and may perform various data processing and arithmetic operations by driving, for example, software (e.g., a program 140). The processor 120 may load commands or data, which are received from other components (e.g., the sensor module 176 or the communication module 190), into volatile memory 132 so as to process the commands or data, and may store the resultant data in non-volatile memory 134. According to one embodiment, the processor 120 may include a main processor 121 (e.g., a central processing unit or an application processor), and an auxiliary processor 123, which operates independently from the main processor 121, additionally or alternatively uses lower power than the main processor 121, or includes the auxiliary processor 123 specialized for a designated function (e.g., a graphic processor device, an image signal processor, a sensor hub processor, or a communication processor). Here, the auxiliary processor 123 may be operated separately from the main processor 121 or in a manner of being embedded with the main processor 121.

In this case, the auxiliary processor 123 may control at least some functions or states associated with at least one of the components of the electronic device 101 (e.g., the display device 160, the sensor module 176, or the communication module 190), on behalf of the main processor 121, for example, while the main processor 121 is in an inactive (e.g., sleep) state, or together with the main processor 121 while the main processor 121 is in an active (e.g., application execution) state. According to one embodiment, the auxiliary processor 123 (e.g., an image signal processor or a communication processor) may be implemented as some other functionally related component (e.g., the camera module 180 or the communication module 190). The memory 130 may store various data used by at least one component (e.g., the processor 120 or the sensor module 176) of the electronic device 101, for example, software (e.g., the program 140) and input or output data for commands which are associated with the software. The memory 130 may include, for example, volatile memory 132 or non-volatile memory 134.

The program 140 may be software stored in the memory 130, and may include, for example, an operating system 142, middleware 144, or application 146.

The input device 150 is a device from the outside (e.g., user) for receiving commands or data to be used in a component (e.g., the processor 120) of the electronic device 101, and may include, for example, a microphone, a mouse, or a keyboard.

The sound output device 155 is a device for outputting a sound signal to the outside of the electronic device 101. The sound output device 155 may include, for example, a speaker for general use, such as multimedia reproduction or sound reproduction, and a receiver used only for telephone reception. According to one embodiment, the receiver may be formed integrally with or separately from the speaker.

The display device 160 is a device for visually providing information to a user of the electronic device 101, and may include, for example, a display, a hologram device, or a projector and a control circuit for controlling the corresponding device. According to one embodiment, the display device 160 may include a touch circuit or a pressure sensor capable of measuring the intensity of pressure of a touch.

The audio module 170 may bidirectionally convert sound and electrical signals. According to one embodiment, the audio module 170 may acquire sound through the input device 150 or may output sound through the sound output device 155 or an external electronic device (e.g., the electronic device 102 (e.g., a speaker or headphone)) connected with the electronic device 101 in a wireless or wired manner.

The sensor module 176 may generate an electrical signal or a data value corresponding to an internal operating state (e.g., power or temperature) of the electronic device 101 or an external environmental condition. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a designated protocol that may be connected to an external electronic device (e.g., the electronic device 102) in a wired or wireless manner. According to one embodiment, the interface 177 may include a high-definition multimedia interface (HDMI), a universal serial bus (USB) interface, a secure digital (SD) card interface, or an audio interface.

A connection terminal 178 may be a connector capable of physically interconnecting the electronic device 101 and an external electronic device (e.g., the electronic device 102), such as an HDMI connector, a USB connector, an SD card connector, or an audio connector (e.g., a headphone connector).

The haptic module 179 may convert an electrical signal into a mechanical stimulus (e.g., vibration or motion) or an electrical stimulus that the user can perceive through a tactile or kinesthetic sense. The haptic module 179 may include, for example, a motor, a piezoelectric element, or an electrical stimulation device.

The camera module 180 is capable of capturing, for example, a still image and a video image. According to one embodiment, the camera module 180 may include one or more lenses, an image sensor, an image signal processor, or a flash.

The power management module 188 is a module for managing power supplied to the electronic device 101, and may be configured as at least a portion of, for example, a power management integrated circuit (PMIC).

The battery 189 is a device for supplying power to at least one component of the electronic device 101, and may include, for example, a non-rechargeable primary battery, a rechargeable secondary battery, or a fuel cell.

The communication module 190 may establish a wired or wireless communication channel between the electronic device 101 and an external electronic device (e.g., the electronic device 102, the electronic device 104, or the server 108), and may support communication via the established communication channel. The communication module 190 may include the processor 120 (e.g., an application processor) and one or more communication processors, which are independently operated and support wired communication or wireless communication. According to one embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module), and may communicate with an external electronic device via the first network 198 (e.g., a short-range communication network, such as Bluetooth, Wi-Fi direct, or infrared data association (IrDA)) or the second network 199 (e.g., a long-range communication network, such as a cellular network, the Internet, or a computer network (e.g., a LAN or a wide area network (WAN)), using a corresponding communication module among the above-mentioned communication modules. Various types of communication modules described above may be implemented as a single chip or may be implemented as separate respective chips.

According to one embodiment, the wireless communication module 192 may identify and authenticate the electronic device 101 within the communication network using the user information stored in the subscriber identification module 196.

The antenna module 197 may include one or more antennas configured to transmit/receive signals or power to/from the outside. According to one embodiment, the communication module 190 (e.g., the wireless communication module 192) may transmit/receive signals to/from an external electronic device via an antenna suitable for the communication scheme thereof.

Among the components described above, some components may be connected to each other via a communication scheme (e.g., a bus, a general-purpose input/output (GPIO), a serial peripheral interface (SPI), or a mobile industry processor interface (MIPI)) and may exchange signals (e.g., commands or data) therebetween.

According to one embodiment, the commands or data may be transmitted or received between the electronic device 101 and the electronic device 104 via the server 108 connected to the second network 199. Each of the electronic devices 102 and 104 may be of a type which is the same as or different from that of the electronic device 101. According to one embodiment, all or some of the operations executed in the electronic device 101 may be executed in another external electronic device or a plurality of external electronic devices. According to one embodiment, in the case where the electronic device 101 should perform a certain function or service automatically or in response to a request, the electronic device 101 may request some functions, which are associated with the function or service, from an external electronic device, instead of, or in addition to, executing the functions or the service by itself. The external electronic device, which receives the request, may execute the requested functions or additional functions, and may transmit the results to the electronic device 101. The electronic device 101 may provide the requested functions or services by processing the received results as they are or additionally. For this purpose, for example, a cloud-computing technique, a distributed computing technique, or a client-server computing technique may be used.

Figure 2:
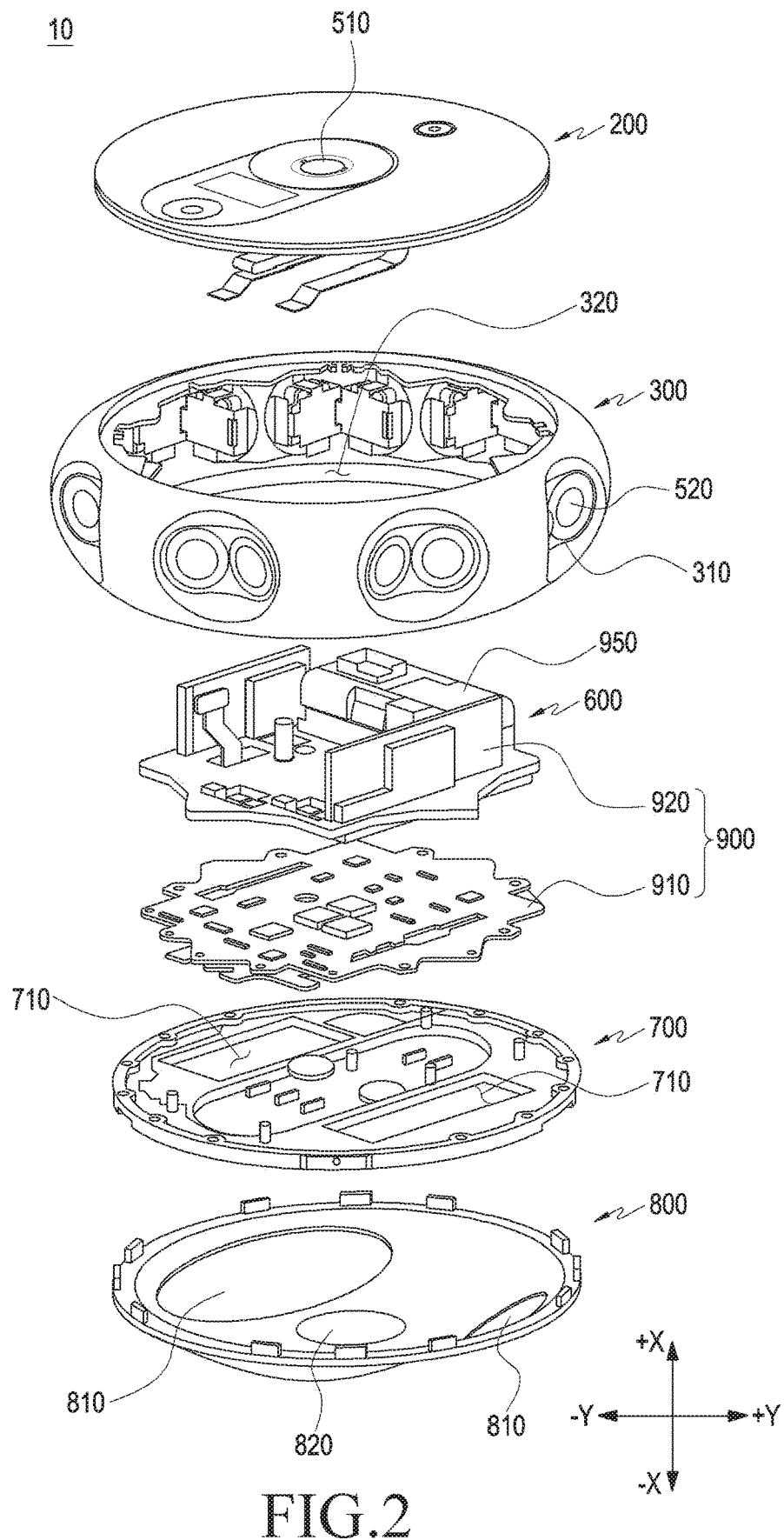
FIG. 2 is a perspective view illustrating an electronic device including a camera according to various embodiments of the disclosure.
Figure 3A:
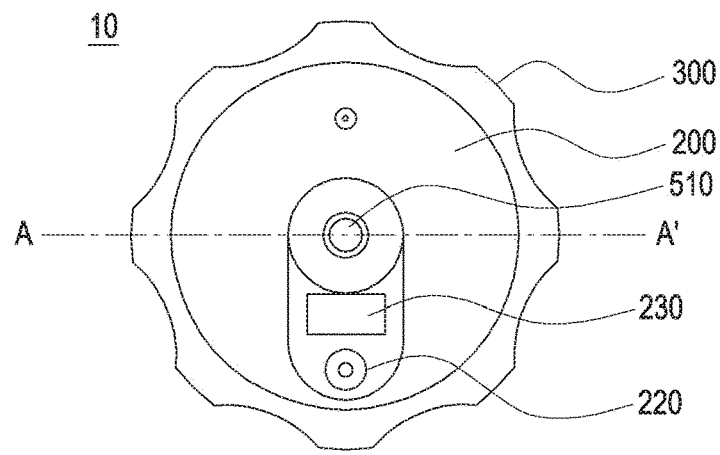
FIGS. 3A, 3B, and 3C are a top plan view, a side view, and a rear view of the electronic device of FIG. 2 including a camera according to various embodiments of the disclosure.
Figure 3B:
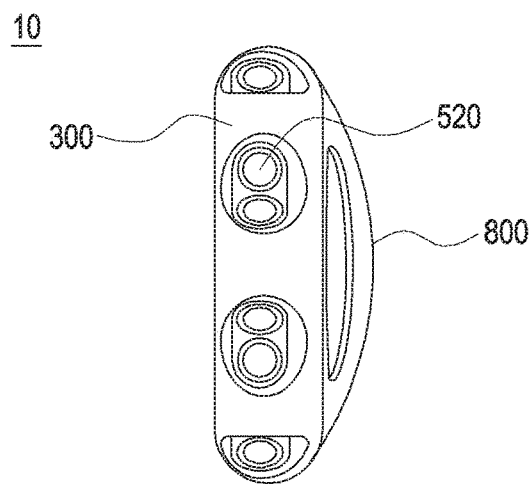
Figure 3C:
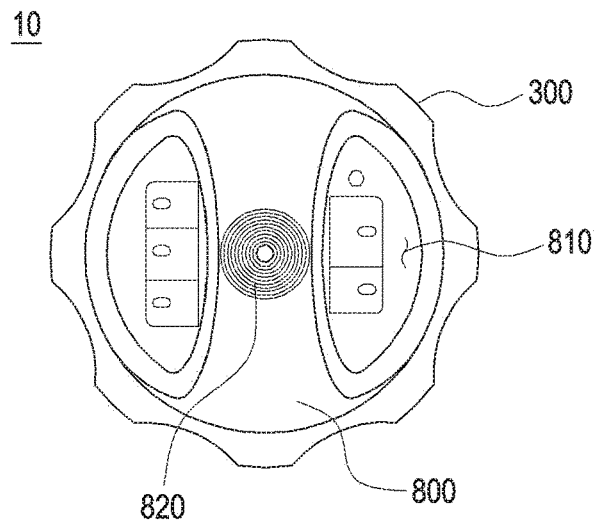

FIG. 2 is a perspective view illustrating an electronic device including a camera according to various embodiments of the disclosure. FIGS. 3A, 3B, and 3C are a top plan view, a side view, and a rear view of the electronic device of FIG. 2 including a camera, according to various embodiments of the disclosure.

In FIG. 2, an "X axis" in an orthogonal coordinate system of three axes may indicate the lateral direction of an electronic device 10, and a "Y axis" may indicate the longitudinal direction of the electronic device 10. In various embodiments, the "X-axis direction" may be referred to as a first direction (+X) or a third direction (−X). The "Y-axis direction" may be referred to as a second direction (+Y, −Y), in which the second direction may mean all directions oriented perpendicular to the first direction.

Referring to FIG. 2 and FIGS. 3A, 3B, and 3C, the electronic device 10 may include an upper cover unit 200, a housing 300, a lower cover unit 700, and/or a rear cover 800 corresponding to the body, and a support member 600 may be included in the housing 300. The electronic device 10 of FIG. 2 and FIGS. 3A to 3C may be partially or wholly identical to the electronic device 101 of FIG. 1.

According to various embodiments, the upper cover unit 200 may be disposed on the upper side of the housing 300, and may include at least one first camera 510 oriented in the first direction (+X), a data input unit 220, and/or a data output unit 230. For example, the first camera 510 is disposed in the center of the upper cover unit 200 so as to capture an image and/or a video image in an upward direction. An input device, such as a keypad, may be employed as the data input unit 220, and a display unit, such as a display device, may be employed as the data output unit 230.

According to various embodiments, the housing 300 provides a space for accommodating various electronic components and the like, and at least a portion of the housing 110 may be made of a conductive material. A plurality of second cameras 520 may be mounted in the housing 300 so as to be oriented in the second direction (+Y) different from the first direction (+X). The plurality of second cameras 520 may be disposed to be exposed to the outer surface of the housing 300 such that omni-directional photographing in the lateral direction is possible.

According to various embodiments, the support member 600 may be mounted within the housing 300. The support member 600 may be made of a metallic material and/or a plastic material, and may be disposed within an accommodation space 320 that is defined by the housing 300 and the upper cover unit 200. The support member 600 provides a space for mounting various electronic components and a battery 950 and/or a printed circuit unit 900, including a printed circuit board, may be accommodated in the space. For example, on the printed circuit unit 900, a processor (e.g., the processor 120 of FIG. 1), a communication module (e.g., the communication module 190 of FIG. 1), various interfaces (e.g., the interface 177 of FIG. 1), a power management module (e.g., the power management module 188 of FIG. 1), or the like may be mounted in the form of an integrated circuit chip. As another example, a control circuit may also be configured as an integrated circuit chip, and may be mounted on the printed circuit unit 900. For example, the control circuit may be a portion of the above-described processor or communication module. Power can be secured by accommodating the battery 950 in the housing 300.

According to one embodiment, the printed circuit unit 900, on which different printed circuit boards (i.e., main printed circuit board 910 and sub printed circuit board 920) are disposed, may be mounted on the upper side and/or the lower side of the support member 600. The support member 600 may prevent the main printed circuit board 910 and the sub printed circuit board 920 from coming into contact with each other, and may prevent electromagnetic interference between integrated circuit chips by providing an electromagnetic shielding function.

According to various embodiments, the lower cover unit 700 may be disposed under the support member 600. The lower cover unit 700 may be made of a metallic material and/or a plastic material, and may be disposed within a space that is defined by the housing 300 and the rear cover 800. The lower cover unit 700 may be disposed under, and bound to, the housing 300 so as to provide a space in which various electronic components can be mounted.

According to various embodiments, the support member 600 and/or the lower cover unit 700 may supplement the rigidity of the electronic device 10. For example, the housing 300 may be formed with a plurality of openings or recesses depending on the arrangement of the electronic components inside the electronic device 10, which may reduce the rigidity of the housing 300 or the electronic device 10. The support member 600 may be mounted within and bound to the housing 300 so as to improve the rigidity of the housing 300 or the electronic device 10.

Although not illustrated in detail in the illustrations, according to various embodiments, various structures may be disposed on the surfaces of the housing 300, the support member, and the lower cover unit 700 according to the arrangement of the electronic components disposed inside the electronic device 10 or the binding structures between the housing 300, the support member 600, and the lower cover unit. For example, a space may be disposed in each the housing 300, the support member 600, and the lower cover unit 700 to accommodate integrated circuit chips mounted on the printed circuit unit 900. The space for accommodating integrated circuit chips may take the form of a recess or may be formed by a rib or the like that surrounds the integrated circuit chips. According to various embodiments, corresponding fastening bosses and fastening holes, which correspond to each other, may be provided in the housing 300, the support member 600, and the lower cover unit 700. For example, by fastening members, such as screws, to the fastening bosses or the fastening holes, the housing 300, the support member 600, and the lower cover unit 700 may be bound to each other in a state in which the housing 300, the support member 600, and the lower cover unit 700 face each other, or in a state in which the support member 600 and the lower cover unit 700 are accommodated in the housing 300.

According to various embodiments, the rear cover 800 may be disposed below the housing 300, and may include at least one opening 810 that is oriented in the third direction (−X). The rear cover 800 may include a fastening portion 820, in the center thereof, which is connected to an external device. In another example, the at least one opening 810 in the rear cover 800 is disposed at a position corresponding to an opening 710 in the lower cover unit 700, and the fastening portion 820 may be connected to an external support device or the like, which is capable of supporting the device 10. The support device may be provided, for example, in a bar shape, so as to support the electronic device 10 at a predetermined height. The electronic device (10) supported by the support device may be placed in an open area, an athletic field, or the like, and is capable of omni-directionally capturing images of the surrounding environment.

Figure 4:
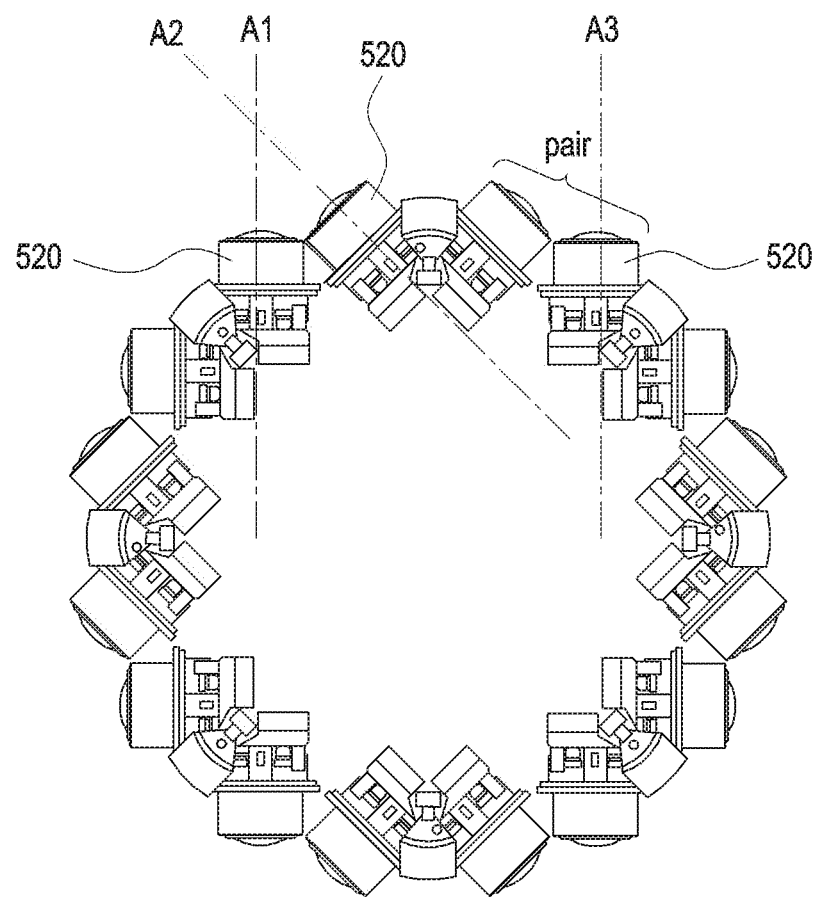
FIG. 4 is a top plan view illustrating an array pattern of a plurality of second cameras disposed in a housing according to various embodiments of the disclosure.
Figure 5:
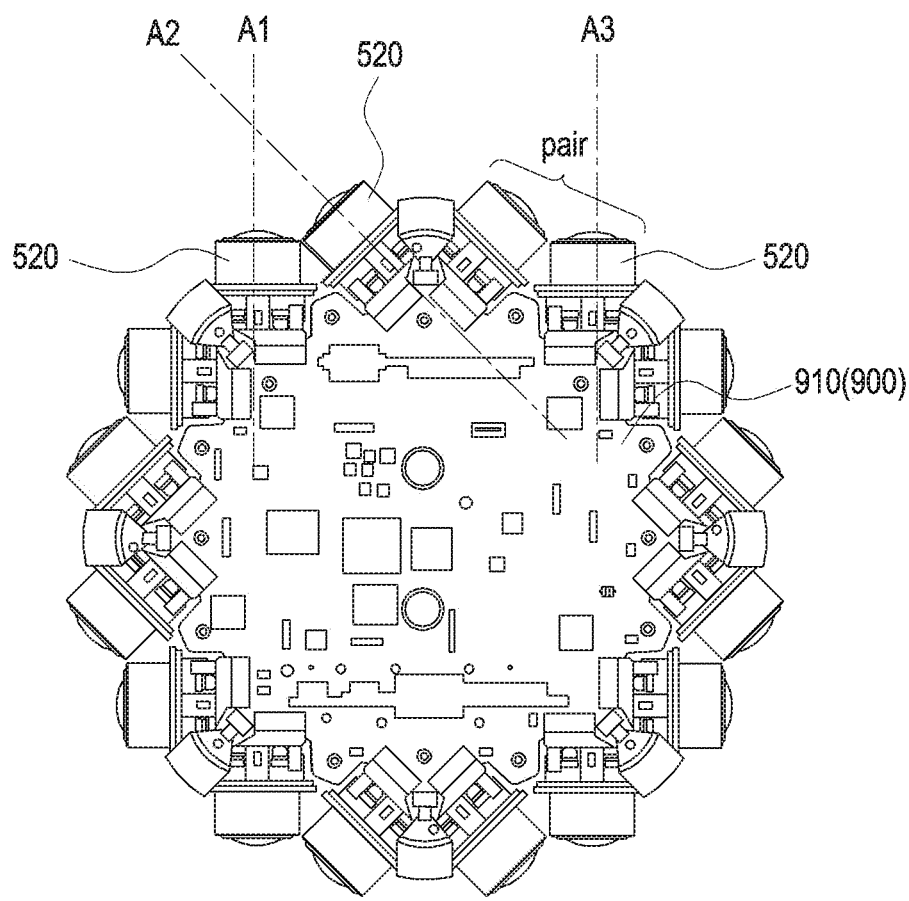
FIG. 5 is a top plan view illustrating a state in which a printed circuit unit is mounted inside the plurality of second cameras of FIG. 4 according to various embodiments of the disclosure.

FIG. 4 is a top plan view illustrating an array pattern of a plurality of second cameras (e.g., the plurality of second cameras 520 of FIG. 2) disposed in the housing (e.g., the housing 300 of FIG. 2), according to various embodiments of the disclosure, and FIG. 5 is a top plan view illustrating the state in which the printed circuit unit 900 is mounted inside the plurality of second cameras of FIG. 4, according to various embodiments of the disclosure.

Referring to FIGS. 4 and 5, two second cameras of the plurality of cameras 520 form one pair, and second camera pairs are secured to a plurality of openings (e.g., openings 310 in FIG. 2) in the housing (e.g., the housing 300 of FIG. 2), respectively. Each of the second cameras of the plurality of cameras 520 forming the one pair has a first virtual axis A1 and a second virtual axis A2 with respect to the center of the lens, and the first virtual axis A1 and the second virtual axis A2 may be disposed to be oriented in different directions. As another example, second cameras of the plurality of cameras 520, which are included in different pairs may have the first virtual axis A1 and a third virtual axis A3, respectively, with reference to a lens center, and the first virtual axis A1 and the third virtual axis A3 may be disposed parallel to each other. For example, the arrangement of a second camera, having the first virtual axis A1, and a second camera, having the third virtual axis A3, may be arranged such that the two lenses may mutually maintain focus in a state where the two lenses are parallel to each other and may acquire a three-dimensional image, like human eyes.

According to various embodiments, the plurality of second cameras 520 may be arranged while maintaining a pattern of predetermined intervals in all orientations (0 to 360 degrees) in the second direction (+Y) so as to omnidirectionally capture images and/or video images in the lateral direction. According to one embodiment, second cameras of the plurality of second cameras 520, which have imaginary axes parallel to each other, may be arranged in a total of 8 pairs, with a predetermined interval therebetween, along a line in any direction. However, the number and arrangement of the plurality of second cameras 520 are not limited thereto, and the number and arrangement of the second cameras may vary in order to be capable of capturing three-dimensional images.

According to various embodiments, in the electronic device (e.g., the electronic device 10 of FIG. 2), the printed circuit unit 900 may be disposed inside the housing (the housing 300 of FIG. 2) and/or be surrounded by the plurality of second cameras 520. The printed circuit unit 900 may be the main printed circuit board 910, and various electronic elements may be arranged in the form of an integrated circuit (IC). The main printed circuit board 910 may include various elements, such as an image-processing element for storing and processing an image captured by a lens assembly (e.g., lens assembly 540). In addition, wired communication terminals for connecting external devices, which are connected to communication units of different circuit boards and connected to external devices through wired connectors, may be disposed on one side of the main printed circuit board 910.

Figure 6:
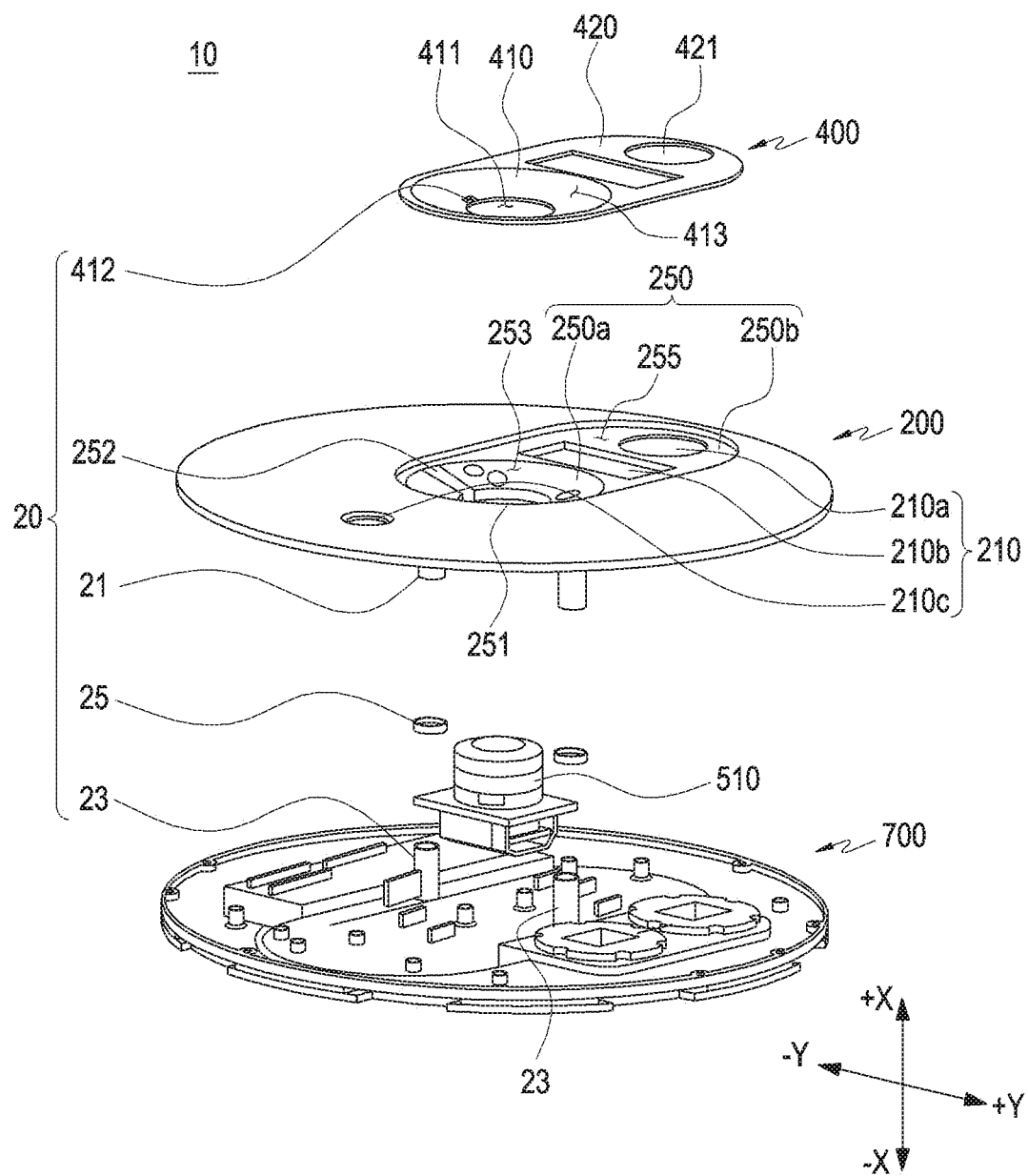
FIG. 6 is an exploded perspective view illustrating respective components of an electronic device including a first camera and a drainage structure according to various embodiments of the disclosure.
Figure 7:
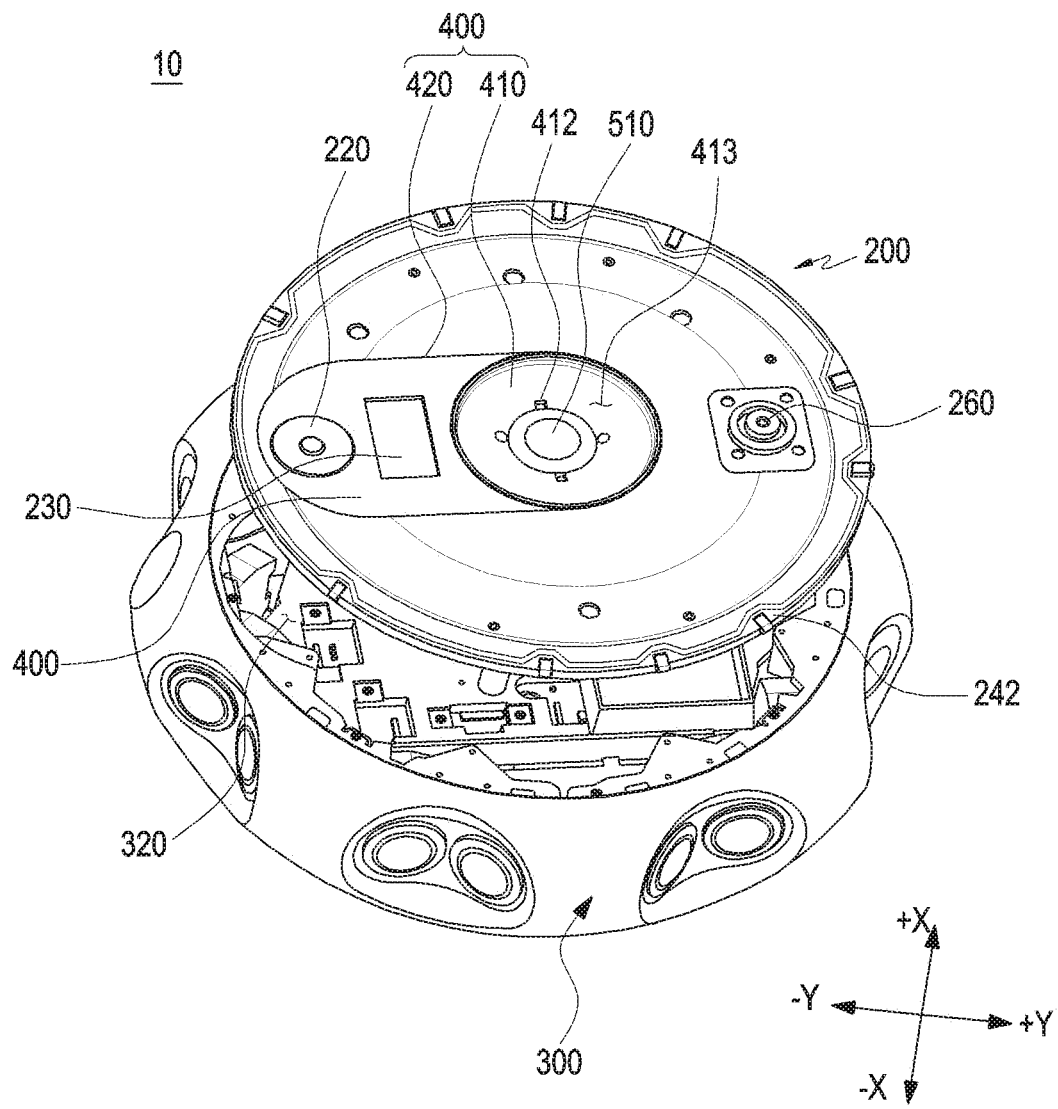
FIG. 7 is a perspective view illustrating a front side of an upper cover unit separated from a housing according to various embodiments of the disclosure.
Figure 8:
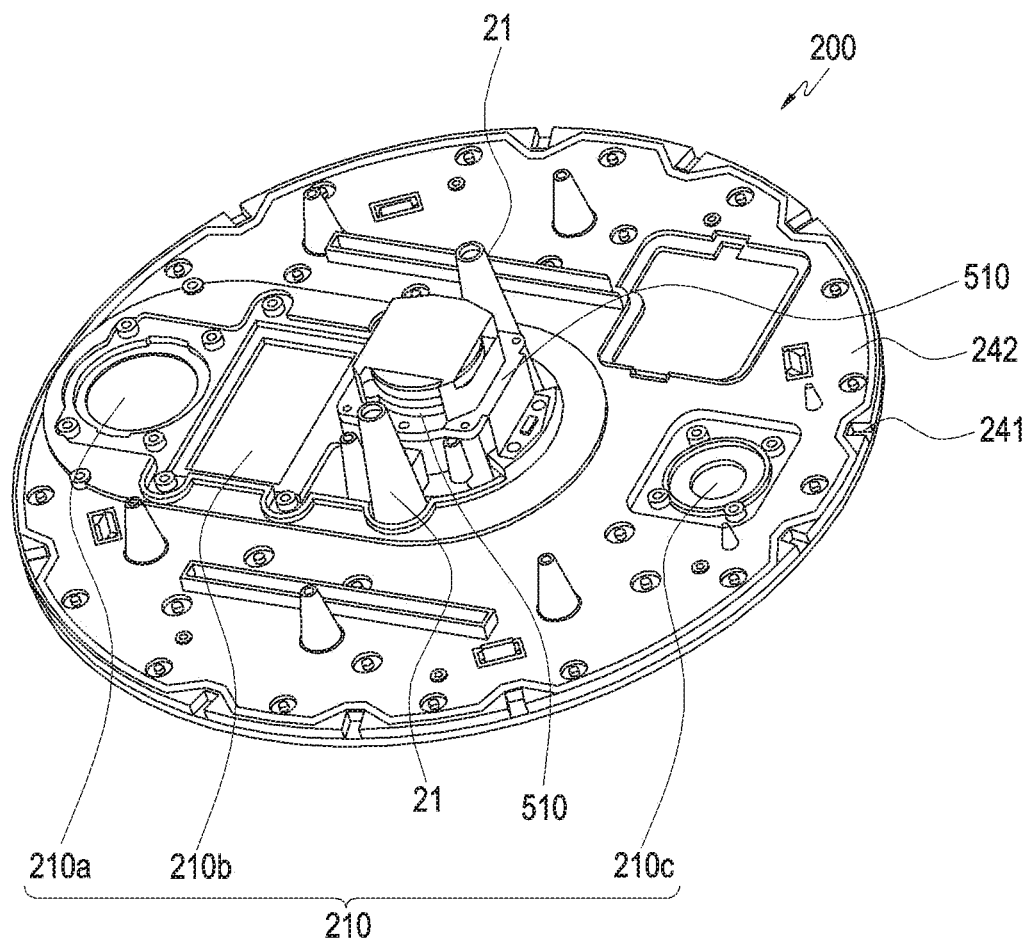
FIG. 8 is a perspective view illustrating a rear side of an upper cover unit including a drainage structure according to various embodiments of the disclosure.

FIG. 6 is an exploded perspective view illustrating respective components of an electronic device including a first camera and a drainage structure according to various embodiments of the disclosure. FIG. 7 is a perspective view illustrating a front side of an upper cover unit separated from a housing according to various embodiments of the disclosure. FIG. 8 is a perspective view illustrating a rear side of an upper cover unit including a drainage structure according to various embodiments of the disclosure.

In FIGS. 6 and 7, an "X axis," in an orthogonal coordinate system of three axes, may indicate the thickness direction of the electronic device 10, and a "Y axis" may indicate the longitudinal direction of the electronic device 10. In various embodiments, the "X-axis direction" may be referred to as a first direction (+X) or a third direction (−X). The "Y-axis direction" may be referred to as a second direction (+Y, −Y), in which the second direction may mean all directions oriented perpendicular to the first direction.

Referring to FIGS. 6, 7, and 8, the electronic device 10 may include the upper cover unit 200, the lower cover unit 700, the first camera 510 exposed through a partial region of the upper cover unit 200, a plate 400 configured to cover at least a portion of the upper region of the upper cover unit 200, and a first conduit 21 and a second conduit 23 extending from the upper cover unit 200 and the lower cover unit 700. As another example, the electronic device may include a housing (e.g., the housing 300 of FIG. 7) disposed between the upper cover unit 200 and the lower cover unit 700 and may provide a space for mounting the first camera 510.

Some or all of the configurations of the upper cover unit 200, the lower cover unit 700, and the housing 300 of FIGS. 6 to 8 are the same as or similar to those of the upper cover unit 200, the lower cover unit 700, and the housing 300 of the electronic device 10 of FIG. 2 and FIGS. 3A to 3C.

According to various embodiments, the upper cover unit 200 is disposed above the housing (e.g., the housing 300 of FIG. 7) and may include one or more holes 210 and 251 exposed in a first direction (+X). The first camera 510, the data output unit 230, such as a display device, or the data input unit 220, such as a key pad, may be exposed to the outside through the one or more holes 210 and 251.

According to various embodiments, the top face of the upper cover unit 200 may include a recessed region 250 in which a partial region is recessed in the third direction (−X). The recessed region 250 may include a first region 250a, in which at least a portion of the first camera 510 is disposed, and a second region 250b, which extends from the first region 250a and in which the data output unit 230 and the data input unit 220 are disposed.

According to one embodiment, the recessed region 250 may be provided in a shape corresponding to the shape of the plate 400, so that the plate 400 can be inserted and seated therein. In the recessed region 250, the first region 250a may have, in the center thereof, a center hole 251 penetrating the upper cover unit 200 so that the lens of the first camera 510 can be exposed to the outside. The first region 250a may include at least one drainage hole 252 around the center hole 251 in the first region 250a, and the at least one drainage hole 252 may be connected to the first conduit 21 disposed on the rear side of the upper cover unit 200.

According to one embodiment, the first region 250a may have a substantially ring shape when viewed from above the upper cover unit 200. The first region 250a may include an inclined face 253 with a slope, of which the height is gradually lowered from the outside to the inside. The inclined face 253 is capable of guiding the movement of an external fluid such that the external fluid flows toward the at least one drainage hole 252. As another example, because the center hole 251 is disposed at the lowest region of the inclined face 253, the height of the lens of the first camera 510, which is exposed to the outside, may be positioned lower than a region other than the first region 250a of the upper cover unit 200. Accordingly, it is possible to prevent stress caused by external shocks or by the electronic device 10 falling, from being directly transmitted to the first camera 510, thereby preventing the first camera 510 from taking damage.

According to one embodiment, the at least one drainage hole 252 may be provided to extend by a length of the radius of the first region 250a except for the radius of the center hole 251. The at least one drainage hole 252 may be designed to have a predetermined slope corresponding to the shape of the inclined face 253. A plurality of (e.g., two) drainage holes may be disposed spaced apart from each other about the center hole 251. However, the shape and the number of at least one drainage hole 252 are not limited thereto, and various design changes may be performed for smooth drainage.

According to one embodiment, the second region 250b in the recessed region is disposed to extend from the first region 250a, and may include a seating groove 255 in which a partial region of the plate 400 is seated, and one or more holes so as to expose, outwards, the data input unit 220 and the data output unit 230 configured to set and confirm some operations of the electronic device.

According to one embodiment, the second region 250*b* may include the seating groove 255 with a predetermined depth, and the second region 250*b* may have a depth different from that of the first region 250*a*. The plate 400 is provided to correspond to the shapes of the first region 250*a* and the second region 250*b*, and may be inserted into the seating groove 255. In order to prevent the plate 400 from moving to the inside of the upper cover unit 200 (e.g., in the third direction (−X)), steps (steps 259 in FIG. 10) may be disposed at the edges of the first region 250*a* and the second region 250*b* so as to support the plate 400.

According to various embodiments, in a region other than the recessed region 250 of the upper cover unit 200, one or more holes and electronic components exposed to the outside through the holes may also be provided. For example, various electronic components may be inserted or seated in one or more holes or grooves disposed in the recessed region 250 of the upper cover unit 200.

According to one embodiment, the data input unit 220 (e.g., a key for a recording function) may be provided inside a first hole 210*a* in the recessed region 250 at one side of the first camera 510, and the key may be exposed to the outside through the first hole 210*a* so as to allow the user to perform an operation to start or stop recording. As another example, the data output unit 230 (e.g., a display device 270 through which various operations of the electronic device 10 may be confirmed or controlled) may be provided inside a second hole 210*b* in the recessed region 250 disposed at the other side of the first camera 510. The display device may include the plate 400 (e.g., a window member) of tempered transparent glass, and a display panel mounted on an inner face of the plate 400. A touch panel may be mounted between the plate 400 and the display panel. For example, the display device may be used as an output device for outputting a screen and as an input device provided with a touch screen function. The plate 400 may close the open front side (e.g., the second hole 210*b*) of the upper cover unit 200.

According to one embodiment, a keypad 260, including a mechanically operated button or a touch key, may be provided inside a third hole 210*c* spaced apart from the data output unit 230 with respect to the first region 250*a*. The keypad 260 may generate an input signal upon contact with the user's body. For example, the keypad 260 may include a 4-way key that is capable of controlling a direction. According to various embodiments, the keypad 260 may be implemented with only mechanical buttons or with only touch keys.

According to various embodiments, the first camera 510, the data output unit 230 (e.g., display device), the data input unit 220 and/or the keypad 260 may include connectors (not illustrated) that may be electrically connected to various circuit devices, which are disposed inside the housing 300, (e.g., the processor 120, the memory 130, the input device 150, the audio module 170, and the like, which are illustrated in FIG. 1 described above). The connectors may include a flexible printed circuit board, and may be formed in various lengths within the accommodation space 320 of the housing 300 to be fastened while making stable contact with a main printed circuit unit (e.g., the main printed circuit board 910 in FIG. 2) and/or a sub-printed circuit unit (the sub printed circuit board 920 in FIG. 2).

According to various embodiments, the upper cover unit 200 may include a first cover unit 241 disposed on the outermost portion of the electronic device 10, and a second cover unit 242 disposed to be stacked with the first cover unit 241. The first cover unit 241 and the second cover unit 242 may have therein the one or more holes 210 and 251, which are formed at corresponding positions therein so as to expose the various electronic devices, which are assembled from the inside to the outside.

According to one embodiment, a sealing member may be disposed between the first cover unit 241 and the second cover unit 242 so as to implement a waterproof structure that blocks the entry of external fluid. A sealing member may also be disposed at the lower end of the second cover unit 242 so as to implement a waterproof structure that blocks the entry of external fluid when the second unit is coupled with the housing 300.

According to various embodiments, the plate 400 configured to cover the exposed electronic device may be located in a region where at least one hole of the upper cover unit 200 is disposed. For example, the plate 400 may cover the second hole 210*b* disposed in the recessed region 250.

According to various embodiments, the plate 400 may be seated in the recessed region 250 formed in the upper cover unit 200. The plate 400 may include a first plate 410 disposed in the first region 250*a* of the recessed region 250 and a second plate 420 disposed in the second region 250*b* of the recessed region 250. The first plate 410 and the second plate 420 may extend from each other and may form different slopes.

According to one embodiment, the first plate 410 may be provided to correspond to the shape of the first region 250*a*. The central region of the first plate 410 may include at least one center hole 411 which penetrates the first plate, so that the lens of the first camera 510 can be exposed to the outside. The peripheral region of the first plate 410 may include at least one drainage opening 412, which may be connected to the at least one drainage hole 252 in the upper cover unit 200. The size of the at least one drainage opening 412 in the first plate 410 may be different from the size of the at least one drainage hole 252 in the first region 250*a*. For example, the at least one drainage opening 412 in the first plate 410 may be smaller than the at least one drainage hole 252, and may be formed as an opening extending from the at least one center hole 411 in a shape in which one side of the at least one center hole 411 is cut.

According to one embodiment, the first plate 410 may have a substantially ring shape when viewed from above the upper cover unit 200. The first plate 410 may include an inclined face 413 with a slope, the height of which is gradually lowered from the outside to the inside. The inclined face 413 is capable of guiding the movement of an external fluid such that the external fluid flows toward the at least one drainage opening 412. The first plate 410 may be made of a translucent material or a transparent material so as to provide a nice appearance to the electronic device 10. As another example, the first plate 410 may be provided with a colored printed layer, or may be provided so as not to be wholly transparent by adhering a colored film layer. The at least one drainage openings 412 may be provided in a number corresponding to the number of the at least one drainage hole 252. For example, two drainage openings may be provided as spaced apart from each other about the at least one center hole 411. However, the shape and number of the at least one drainage hole 252 are not limited thereto, and various design changes may be performed for smooth drainage.

According to one embodiment, the second plate 420 may be disposed to extend from the first plate 410, and may be provided to correspond to the shape of the second region 250*b*. A region where the data output unit 230 is exposed to the outside may be provided and covered with a transparent window. For example, a partial region of the second plate 420 may include a transparent plate (e.g., a window made of tempered glass) with a shape corresponding to the second hole 210b, so that the data output unit 230, such as a display device disposed therein, can be protected.

As another example, the data input unit 220 is a region directly operated by the user, and the other region of the second plate 420 may be provided with a hole 421 corresponding to the first hole 210a such that the data input unit 220 is exposed to the outside. The region other than the transparent plate and the hole 421 in the second plate 420 may be manufactured to have a colored translucent material so as to provide a nice appearance to the electronic device 10. For example, the second plate 420 may be provided with a colored printed layer, or may be provided so as not to be wholly transparent by adhering a colored film layer.

According to various embodiments, the lower cover unit 700 is disposed below the housing 300 so as to support the inner components of the electronic device 10, and may include a conduit disposed inwardly (e.g., the first direction (+X)). The front side of the lower cover unit 700 may face a main printed circuit unit (e.g., the main printed circuit board 910 of FIG. 2), and may include at least one heat dissipation fin structure (not illustrated) on the rear side thereof. The heat dissipation fin structure (not illustrated) may be disposed at the center of the lower cover unit 700, which may be the lower portion of the region where the AP chips, which are the main heat sources of the above-mentioned main printed circuit unit, are disposed. The heat generated from the main printed circuit unit (e.g., the main printed circuit board 910 in FIG. 2) can be transferred to the heat dissipation fin structure under the lower cover unit 700 so as to be efficiently dissipated in the third direction (−X).

According to various embodiments, the lower cover unit 700 may include at least one opening (e.g., the opening 710 in FIG. 2), which is exposed to the outside. For example, a connector (not illustrated) that is capable of providing an electrical connection with the main printed circuit board 910 and/or the sub-printed circuit unit (e.g., the sub printed circuit board 920 of FIG. 2) through the at least one opening may be disposed.

According to various embodiments, the first camera 510 may be disposed in the center of the upper cover unit 200 so as to be exposed and oriented in the first direction (+X). According to various embodiments, the first camera 510 may include a camera housing 530, the lens assembly 540, an image sensor 590, a printed circuit unit 570, a base 550, etc. (see FIG. 10). The camera housing 530 may serve as a cover for protecting the lens assembly 540 mounted therein. The lens assembly 540 is disposed inside the camera housing 530 and the base 550, and may include at least one wide-angle lens. For example, the wide-angle lens may include various lenses, such as a fisheye lens, an ultra-wide-angle lens, and the like.

According to one embodiment, the fish-eye lens used in the first camera 510 is an ultra-wide-angle lens with an oblique angle of more than 180 degrees, and allows an entire object with a view field of 180 degrees to be photographed within one circle. The lens assembly 540 may further include an optical member, such as a concave lens or a convex lens, arranged on a light path so as to adjust the focal distance, in addition to the wide-angle lens.

According to one embodiment, a protective member 560 may be disposed inside the camera housing 530 and outside the lens assembly 540 so as to be capable of protecting at least some of the lenses of the lens assembly 540 and affixing the wide-angle lens.

According to one embodiment, the image sensor 590 is disposed inside the camera housing 530 and serves both to detect subject information obtained from the lens assembly 540 and to convert the subject information into an electrical image signal. For example, a charge-coupled device (CCD) image sensor or a complementary metal oxide semiconductor (CMOS) image sensor may be used as the image sensor 590. However, without being limited thereto, other sensor elements which perform similar functions may be included.

According to one embodiment, the sensors provided in the first camera 510 may include, in addition to the image sensor 590, an operation recognition sensor configured to recognize the user's operation and a voice recognition sensor configured to recognize the user's voice. In addition, each of the sensors may sense various kinds of information according to the user's commands, and may transmit the sensed information to a control circuit of the printed circuit unit 570.

According to various embodiments, the first camera 510 may be disposed in the center of the upper cover unit 200 so as to capture images and/or video images above the electronic device 10, and may be associated with the plurality of second cameras 520 so as to acquire three-dimensional images. However, according to one embodiment, the number and arrangement of the plurality of second cameras 520 are not limited, and the number and arrangement of the first cameras may vary so as to be capable of capturing three-dimensional images.

According to various embodiments, a drainage structure 20 may include the first conduit 21 extending from the upper cover unit 200, the second conduit 23 extending from the lower cover unit 700, a sealing member 25, at least one drainage hole 252, or the like. The drainage structure 20 may be configured such that the fluid introduced into the upper cover unit 200 is capable of passing through the at least one drainage hole 252 without remaining around the first camera 510 so as to be discharged outside through the first conduit 21 and the second conduit 23. Hereinafter, the drainage structure 20 including the first conduit 21 and the second conduit 23 will be described in detail.

Figure 9:
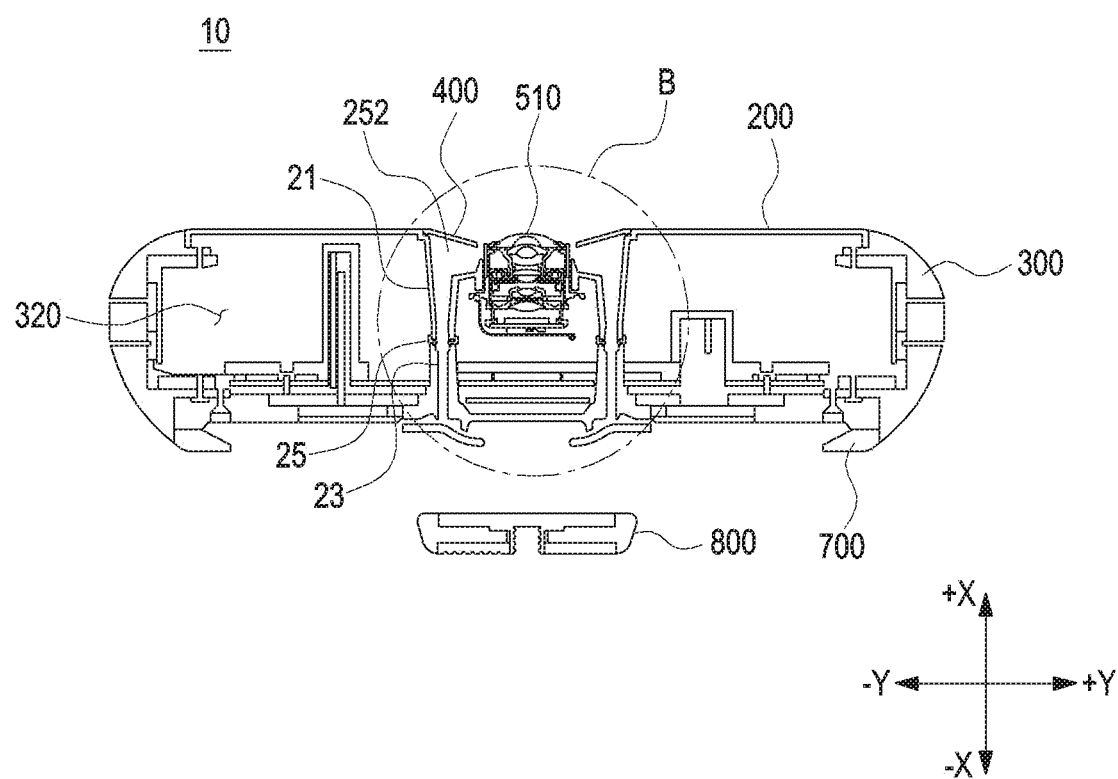
FIG. 9 is a sectional view taken along line A-A' of FIG. 3A, in which a drainage structure in an electronic device is illustrated according to various embodiments of the disclosure.
Figure 10:
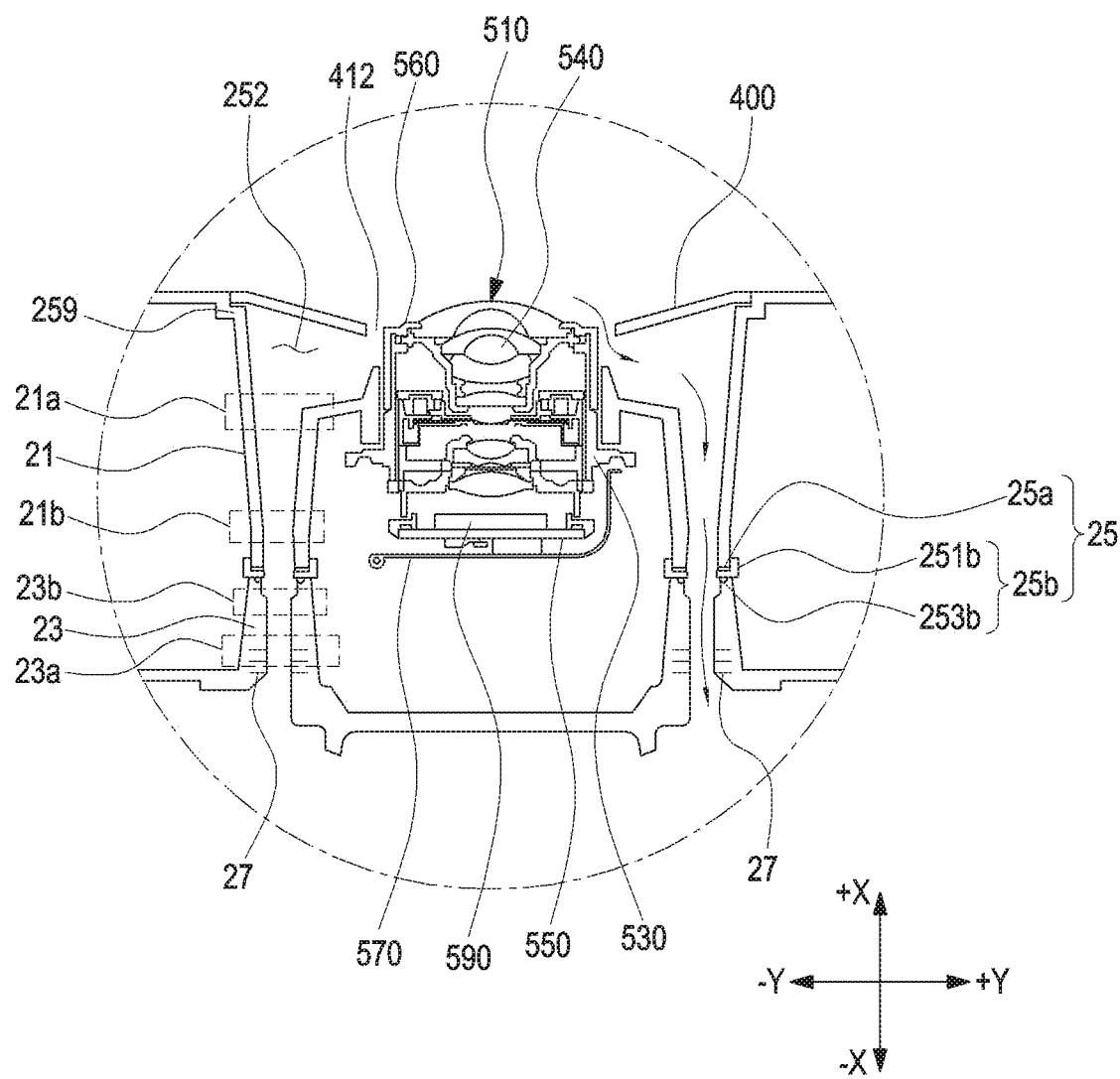
FIG. 10 is a cross-sectional view in which a region B in FIG. 9 is enlarged according to various embodiments of the disclosure.

FIG. 9 is a sectional view taken along line A-A' of FIG. 3A, in which a drainage structure in an electronic device is illustrated according to various embodiments of the disclosure. FIG. 10 is a cross-sectional view in which a region B in FIG. 9 is enlarged according to various embodiments of the disclosure.

Referring to FIGS. 9 and 10, the electronic device 10 may include the upper cover unit 200, the lower cover unit 700, the first camera 510 exposed through a partial region of the upper cover unit 200, the plate 400 configured to cover at least a portion of the upper region of the upper cover unit 200, and first and second conduits 21 and 23 extending from the upper cover unit 200 and the lower cover unit 700. As another example, the electronic device may include the housing 300 disposed between the upper cover unit 200 and the lower cover unit 700 and may provide a space for mounting the first camera 510.

Some or all of the configurations of the upper cover unit 200, the lower cover unit 700, and the housing 300 of FIGS. 9 to 10 are the same as or similar to those of the upper cover unit 200, the lower cover unit 700, and the housing 300 of the electronic device 10 of FIG. 2 and FIGS. 3A to 3C.

Referring to FIGS. 9 and 10, an "X axis" in an orthogonal coordinate system of three axes may indicate the lateral direction of the electronic device 10, and a "Y axis" may indicate the longitudinal direction of the electronic device 10. In various embodiments, the "X-axis direction" may be referred to as a first direction (+X) or a third direction (−X). The "Y-axis direction" may be referred to as a second direction (+Y, −Y), in which the second direction may mean all directions oriented perpendicular to the first direction.

A drainage structure will be described with reference to FIG. 6 and FIGS. 8 to 10. The drainage structure 20 may include at least one drainage hole 252 in the upper cover unit 200, at least one first conduit 21 extending in the third direction (−X) from the upper cover unit 200, the second conduit 23 extending from the lower cover unit 700 in the first direction (+X), and a sealing member 25 disposed between the first conduit 21 and the second conduit 23. As another example, the drainage structure 20 may include the at least one drainage opening 412 in the plate 400 that extends with the at least one drainage hole 252 and is disposed adjacent to the first camera 510.

According to various embodiments, the at least one drainage hole 252 in the upper cover unit 200 is provided to penetrate the upper cover unit 200, as described above, and the first region 250*a* may be configured in an inclined shape, the height of which is gradually lowered from the outside to the inside (e.g., the center hole 251). A plurality of drainage holes may be disposed adjacent to the first camera 510 on opposite sides of the first camera 510 so as to provide smooth drainage.

According to various embodiments, the at least one drainage opening 412 in the plate, which is connected to the at least one drainage hole 252, may be disposed on the top face of the upper cover unit 200. The at least one drainage opening 412 may be disposed to correspond to the position of the at least one drainage hole 252 and may be smaller than the at least one drainage hole 252. A portion of the plate 400 around the at least one drainage opening 412 may include an inclined face, the height of which gradually decreases from the outside to the inside (e.g., the at least one center hole 411), and the inclined face is capable of guiding external fluid to flow toward the at least one drainage opening 412.

According to various embodiments, the first conduit 21 may be disposed on the rear side of the upper cover unit 200, and may protrude so that is it oriented in the third direction (−X). The first conduit 21 may extend from the upper cover unit 200. For example, the first conduit 21 may be made of the same material as the upper cover unit 200, and may be formed integrated with the upper cover unit 200.

According to one embodiment, the first conduit 21 may be disposed to pass through the accommodation space 320 of the housing 300. The first conduit 21 may be disposed so as not to be exposed to the outside of the electronic device 10 in order to maintain the overall shape of the appearance of the electronic device 10, thereby maintaining a nice appearance thereof.

According to one embodiment, the first conduit 21 may include a first portion 21*a* connected to the at least one drainage hole 252 and a second portion 21*b* connected to the second conduit 23. The first portion 21*a* may be manufactured to a size corresponding to the shape of the at least one drainage hole 252, and the sizes or diameters of the openings of the first portion 21*a* and the second portion 21*b* may be different from one another. For example, the outer diameter of the first portion 21*a* may be larger than the outer diameter of the second portion 21*b*.

According to one embodiment, the inner diameter of the first conduit 21 may be made so that it is entirely constant except for the first portion 21*a* adjacent to the at least one drainage hole 252. As another example, the inner diameters of the first portion 21*a* and the second portion 21*b* of the first conduit 21 may be made equal to each other.

According to one embodiment, when the diameter of the first conduit 21 is sharply reduced in the third direction (−X), this may interfere with the smooth flow of the fluid passing through the first conduit 21. Thus, the inner diameter of the lower end of the first conduit 21 (e.g., the second portion 21*b*) may be processed so as to maintain the overall diameter substantially constant. For example, the shape of the outer face of the first conduit 21 may have an outer diameter that is reduced in the third direction (−X), but the inner diameter of the first conduit 21 may be made constant or similar in size. The first conduit 21, disposed in the accommodation space 320 of the housing 300 of the electronic device 10, may be processed only in the inner diameter thereof so as not to damage the space for mounting the electronic components mounted in the vicinity thereof.

According to one embodiment, a plurality of first conduits may be provided in a number corresponding to the number of drainage holes. For example, the plurality of first conduits may be disposed around the first camera 510, and may be spaced apart from each other so as to ensure the desired drainage. However, the shape and number of first conduits are not limited thereto, and various design changes may be made for connection and drainage with the at least one drainage hole 252.

According to various embodiments, the second conduit 23 may be disposed on the front side of the lower cover unit 700, and may protrude so that it is oriented in the first direction (+X). The second conduit 23 may extend from the lower cover unit 700 so that it may be connected to the first conduit 21. For example, the second conduit 23 may be made of the same material as the lower cover unit 700, and may be formed integrated with the upper cover unit 200.

According to one embodiment, the second conduit 23 may be disposed to pass through the accommodation space 320 of the housing 300. The second conduit 23 may be disposed so as not to be exposed to the outside of the electronic device 10 and so as to maintain the overall shape of the appearance of the electronic device 10, thereby maintaining a nice appearance thereof.

According to one embodiment, the second conduit 23 may include a third portion 23*a* connected to the outer space and a fourth portion 23*b* connected to the first conduit 21. The fluid that has passed through the third portion 23*a* may be discharged to the outer space and the fourth portion 23*b* may have a size corresponding to the shape of the second portion 21*b* of the first conduit 21. The opening sizes or diameters of the third portion 23*a* and the fourth portion 23*b* may be different from one another. For example, the outer diameter of the third portion 23*a* may be larger than the outer diameter of the fourth portion 23*b*.

According to one embodiment, the diameter of the second conduit 23 may be made entirely constant except for the third portion 23*a* adjacent to the outer space. As another example, the inner diameters of the third portion 23*a* and the fourth portion 23*b* of the second conduit 23 may be made equal to each other.

When the diameters of the third portion 23*a* and the fourth portion 23*b* of the second conduit 23 are different from each other, the fluid passing through the second conduit 23 may not flow smoothly. Therefore, the upper end of the second conduit 23 (e.g., the third portion 23*a*) may be processed so as to maintain the overall diameter constant. For example, the shape of the outer face of the second conduit 23 may have an outer diameter that is reduced in the first direction (+X), but the inner diameter of the second conduit 23 may be made constant or similar in size. The second conduit 23 disposed in the accommodation space 320 of the housing 300 of the electronic device 10 may be processed only in the inner diameter thereof so as not to damage the mounting space for the electronic components mounted in the vicinity thereof.

According to one embodiment, a plurality of second conduits may be provided corresponding to the number of drainage holes 21. For example, the plurality of second conduits may be disposed around the first camera 510, and may be spaced apart from each other so as to ensure the desired drainage. However, the shape and number of second conduits are not limited thereto, and various design changes may be made for connection and drainage through the at least one drainage hole 252.

According to one embodiment, the second conduit 23 may include a threaded structure 27 in the third portion 23a. For example, the threaded structure 27 may be cut in a spiral shape along the inner diameter of the third portion 23a, and the fluid passing through the second conduit 23 may be guided so that it is smoothly discharged into the outer space.

According to one embodiment, the second conduit 23 may dissipate heat generated from the electronic components disposed in the lower cover unit 700. For example, the second conduit 23 that extends from the lower cover unit 700 inwards (e.g., in the first direction (+X)) may dissipate heat by increasing the surface area of the lower cover unit 700. As another example, the first conduit 21 and the second conduit 23 may serve as pillars in the inner space of the housing 300 so as to perform as support structures to prevent the sagging of the upper cover unit 200.

According to various embodiments, the sealing member 25 may be disposed between the first conduit and the second conduit so as to prevent fluid flowing through the conduit from entering the inside of the housing 300. The sealing member 25 may include a sealing tape 25a and an O-ring unit 25b. For example, the sealing tape 25a may be located at the lower end of the second portion 21b of the first conduit 21 so that the O-ring unit 25b can be attached to the first conduit 21. The sealing member 25 may include an opening in the inner side such that the fluid that has passed through the first conduit 21 is directed toward the second conduit 23.

According to one embodiment, the O-ring unit 25b may be made of a material including silicone or rubber for waterproofing, and may include a guide portion 251b and an embossment 253b. The guide portion 251b may be disposed such that a portion thereof surrounds the first conduit 21 and such that the remaining portion may be attached to the sealing tape 25a. The embossment 253b protrudes in the third direction (−X) of the guide portion 251b, and is fitted into and overlaps a stepped region disposed in the third portion 23a of the second conduit 23. The sealing member 25 is an example of a sealing structure, and may be designed and modified in various ways to protect the connection portion of the first conduit 21 and the second conduit 23 from the outside. For example, the structure of the O-ring unit 25b may be designed and modified in various forms, such as a structure implemented to be integrated with the first conduit 21 and/or the second conduit 23.

The drainage structure 20, according to various embodiments, can solve the flooding problem of both the lens of the first camera 510, which is located around the first camera 510 and is exposed to the outside, and the surroundings of the lens of the first camera 510. In addition, by arranging the drainage structure so as to pass through the inside of the housing 300, a nice aesthetic sense of the electronic device can be provided, without damaging the appearance of the electronic device.

According to various embodiments, an electronic device may include: an upper cover unit in which at least one first camera facing a first direction is disposed; a housing in which a plurality of second cameras facing a second direction different from the first direction is disposed; a lower cover unit disposed to face the upper cover unit with the housing interposed therebetween and configured to cover a third direction different from the first direction; and a drainage structure which penetrates the housing from the upper cover unit and is connected to the lower cover unit.

The drainage structure may include a drainage hole disposed adjacent to the at least one first camera, at least one first conduit extending from the upper cover unit in the third direction, and at least one second conduit extending in the first direction from the lower cover unit and connected to the first conduit.

According to various embodiments, the electronic device may further include a sealing member disposed between the at least one first conduit and the at least one second conduit and configured to prevent fluid, which flows from the first conduit to the second conduit, from being introduced into the housing.

According to various embodiments, the electronic device may further include a plate disposed in a recessed region provided in the upper cover unit and configured to surround at least a portion of a periphery of the first camera. The plate may include at least one drainage opening extending to the at least one drainage hole.

According to various embodiments, the first conduit may include a first portion connected to the drainage hole and a second portion connected to the second conduit, and the outer diameters of the first portion and the second portion may be different from each other.

According to various embodiments, the inner diameters of the first portion and the second portion of the first conduit may be equal to each other.

According to various embodiments, the second conduit may include a third portion connected to an outer space and a fourth portion connected to the first conduit, and the outer diameters of the third portion and the fourth portion may be different from each other.

According to various embodiments, the inner diameters of the third portion and the fourth portion of the second conduit may be equal to each other, and the third portion may include a threaded structure configured to guide the discharge of fluid, which passes through the second conduit, to the outer space.

According to various embodiments, the size of the inner diameter of the second portion of the first conduit may correspond to the size of the inner diameter of the third portion of the second conduit.

According to various embodiments, the upper cover unit may include a recessed region in which a partial region of a top face thereof is recessed in the second direction, and the recessed region may include a first region, including a center hole passing through the upper cover unit and a drainage hole arranged adjacent to the center hole so as to allow the lens of the first camera to be exposed to the outside, as well as a second region extending from the first region and including at least one hole disposed to expose a data output unit or a data input unit disposed on a bottom face of the upper cover unit.

According to various embodiments, the first region may include an inclined face with a slope the height of which is reduced from an edge region toward the center hole, and the height of the lens of the first camera, which protrudes through the center hole, may be lower than a region, other than the first region, of the upper cover unit.

According to various embodiments, the drainage hole in the first region may have a predetermined slope corresponding to the shape of the inclined face, and may be provided in a plurality so as to be spaced apart from each other around the center hole.

According to various embodiments, the first region and the second region may have different depths with respect to one face of the upper cover unit, other than the recessed region.

According to various embodiments, the plate seated in the recessed region of the upper cover unit may include a first plate disposed in the first region and a second plate extending from the first plate and disposed in the second region. The first plate may include an inclined face corresponding to the inclined face of the first region.

According to various embodiments, the first plate may include a center hole opened to expose a lens of the first camera to the outside and at least one drainage opening extending outwards from the center hole. The drainage opening may be smaller than the drainage hole.

According to various embodiments, the second plate may be formed of a transparent plate corresponding to the data output unit, and a region corresponding to the data input unit may be formed as a hole that is opened so that the data input unit is exposed to the outside.

According to various embodiments, the sealing member may include a sealing tape, which comes in contact with a lower end of the first conduit, and an O-ring unit which surrounds the lower end of the first conduit and is fitted into a stepped portion of the second conduit; additionally, the sealing member may include an opening such that the fluid that has passed through the first conduit is directed toward the second conduit.

According to various embodiments, an electronic device may include: an upper cover unit in which at least one first camera facing a first direction is disposed; a housing in which a plurality of second cameras facing a second direction perpendicular to the first direction is disposed; a plate coupled to the upper cover unit and configured to include an inclined face on one surface thereof to enclose a periphery of the first camera; and a drainage structure configured to prevent flooding of the first camera.

The drainage structure may include a drainage opening disposed at a lower end of the inclined face and adjacent to the first camera, a drainage hole connected to the drainage opening and disposed through the upper cover unit, and at least one conduit disposed through the housing and extending from the drainage hole.

According to various embodiments, the electronic device may further include a lower cover unit disposed at a lower end of the housing and configured to cover a third direction opposite the first direction. The at least one conduit may include at least one first conduit extending from the upper cover unit in the third direction, and at least one second conduit extending in the first direction from the lower cover unit and connected to the first conduit.

According to various embodiments, the drainage structure may further include a sealing member disposed between the at least one first conduit and the at least one second conduit and configured to prevent fluid, which flows from the first conduit to the second conduit, from being introduced into the housing.

According to various embodiments, the size of the inner diameter of the lower end of the first conduit may correspond to the size of the inner diameter of the upper end of the second conduit, and the first conduit and the second conduit may be provided in a plurality to be spaced apart from each other around the first camera.

According to various embodiments, an electronic device may include: a main body; at least one first camera disposed toward a first direction; a plurality of second cameras disposed toward a second direction different from the first direction; and a drainage hole disposed at a portion of the main body adjacent to the first camera, the drainage hole facing the first direction.

According to various embodiments, the first camera and the plurality of second cameras may be used to acquire a panoramic image or a stereoscopic image.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   an upper cover in which at least one first camera facing a first direction is disposed;
   a housing in which a plurality of second cameras is disposed facing a second direction different from the first direction;
   a lower cover disposed to face the upper cover with the housing interposed therebetween, the lower cover being configured to cover a third direction different from the first direction; and
   a drainage structure penetrating the housing from the upper cover and connected to the lower cover,
   wherein the drainage structure comprises:
      a drainage hole disposed adjacent to the at least one first camera,
      at least one first conduit extending from the upper cover in the third direction, and
      at least one second conduit extending in the first direction from the lower cover and connected to the at least one first conduit.

2. The electronic device of claim 1, further comprising:
   a sealing member disposed between the at least one first conduit and the at least one second conduit,
   wherein the sealing member is configured to prevent fluid, which flows from the at least one first conduit to the at least one second conduit, from being introduced into the housing.

3. The electronic device of claim 2, further comprising:
   a plate disposed in a recessed region provided in the upper cover,
   wherein the plate is configured to surround at least a portion of a periphery of the at least one first camera, and
   wherein the plate includes at least one drainage opening extending to the drainage hole.

4. The electronic device of claim 2,
   wherein the at least one first conduit includes a first portion connected to the drainage hole and a second portion connected to the at least one second conduit, and
   wherein outer diameters of the first portion and the second portion are different from each other.

5. The electronic device of claim 4, wherein inner diameters of the first portion and the second portion of the at least one first conduit are equal to each other.

6. The electronic device of claim 4,
wherein the at least one second conduit includes a third portion connected to an outer space and a fourth portion connected to the at least one first conduit, and
wherein outer diameters of the third portion and the fourth portion are different from each other.

7. The electronic device of claim 6,
wherein inner diameters of the third portion and the fourth portion of the at least one second conduit are equal to each other, and
wherein the third portion includes a threaded structure configured to guide discharge of the fluid, which passes through the second conduit, to the outer space.

8. The electronic device of claim 6, wherein a size of an inner diameter of the second portion of the at least one first conduit corresponds to a size of an inner diameter of the third portion of the at least one second conduit.

9. The electronic device of claim 2,
wherein the upper cover includes a recessed region in which a partial region of a top face thereof is recessed in the second direction, and
wherein the recessed region comprises:
a first region including a center hole passing through the upper cover and the drainage hole arranged adjacent to the center hole to allow a lens of the at least one first camera to be exposed to an outside; and
a second region extending from the first region and including at least one hole disposed to expose a data outputter or a data inputter disposed on a bottom face of the upper cover.

10. The electronic device of claim 9,
wherein the first region includes an inclined face having a slope of which a height is reduced from an edge region toward the center hole, and
wherein a height of the lens of the at least one first camera, which protrudes through the center hole, is lower than a region, other than the first region, of the upper cover.

11. The electronic device of claim 10,
wherein the drainage hole in the first region has a predetermined slope corresponding to a shape of the inclined face, and
wherein the drainage hole is provided in a plural number so as to be spaced apart from each other around the center hole.

12. The electronic device of claim 10,
wherein a plate seated in the recessed region of the upper cover includes a first plate disposed in the first region and a second plate extending from the first plate and disposed in the second region, and
wherein the first plate includes an inclined face corresponding to the inclined face of the first region.

13. The electronic device of claim 12,
wherein the first plate includes a center hole opened to expose a lens of the at least one first camera to the outside and at least one drainage opening extending outwards from the center hole, and
wherein the at least one drainage opening is smaller than the drainage hole.

14. The electronic device of claim 12, wherein the second plate is formed of a transparent plate corresponding to the data outputter, and a region corresponding to the data inputter is formed as a hole that is opened so that the data inputter is exposed to the outside.

15. The electronic device of claim 9, wherein the first region and the second region have different depths with respect to one face of the upper cover, other than the recessed region thereof.

16. The electronic device of claim 2,
wherein the sealing member includes a sealing tape, which is in contact with a lower end of the at least one first conduit, and an O-ring structure surrounding the lower end of the at least one first conduit and fitted into a stepped portion of the at least one second conduit, and
wherein the sealing member includes an opening such that the fluid that has passed through the at least one first conduit is directed toward the at least one second conduit.

17. An electronic device comprising:
an upper cover in which at least one first camera facing a first direction is disposed;
a housing in which a plurality of second cameras is disposed facing a second direction perpendicular to the first direction;
a plate coupled to the upper cover and configured to include an inclined face on one surface thereof to enclose a periphery of the at least one first camera; and
a drainage structure configured to prevent a flooding of the at least one first camera,
wherein the drainage structure comprises:
a drainage opening disposed at a lower end of the inclined face and adjacent to the at least one first camera,
a drainage hole connected to the drainage opening and disposed through the upper cover, and
at least one conduit disposed through the housing and extending from the drainage hole.

18. The electronic device of claim 17, further comprising:
a lower cover disposed at a lower end of the housing and configured to cover a third direction opposite the first direction,
wherein the at least one conduit includes at least one first conduit extending from the upper cover in the third direction and at least one second conduit extending in the first direction from the lower cover and connected to the at least one first conduit.

19. The electronic device of claim 18,
wherein the drainage structure further comprises a sealing member disposed between the at least one first conduit and the at least one second conduit, and
wherein the drainage structure is configured to prevent fluid, which flows from the at least one first conduit to the at least one second conduit, from being introduced into the housing.

* * * * *